(12) United States Patent  
Wang et al.

(10) Patent No.: US 9,313,575 B2  
(45) Date of Patent: Apr. 12, 2016

(54) MULTIFUNCTIONAL LED DEVICE AND MULTIFUNCTIONAL LED WIRELESS CONFERENCE SYSTEM

(71) Applicant: ZHEJIANG SHENGHUI LIGHTING CO., LTD, Jiaxing (CN)

(72) Inventors: Xia Wang, Jiaxing (CN); Chaoqun Sun, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 104 days.

(21) Appl. No.: 14/284,512

(22) Filed: May 22, 2014

(65) Prior Publication Data

US 2014/0254829 A1    Sep. 11, 2014

Related U.S. Application Data

(63) Continuation-in-part of application No. PCT/CN2013/072808, filed on Mar. 18, 2013.

(30) Foreign Application Priority Data

Feb. 1, 2013   (CN) .......................... 2013 1 0047401

(51) Int. Cl.
  *H03G 3/00*    (2006.01)
  *H04R 3/12*    (2006.01)
  *H04M 3/56*    (2006.01)
  *H04R 1/02*    (2006.01)
  *H05B 37/02*   (2006.01)

(52) U.S. Cl.
  CPC . *H04R 3/12* (2013.01); *H04M 3/56* (2013.01); *H04R 1/028* (2013.01); *H04R 2201/021* (2013.01); *H04R 2227/005* (2013.01); *H04R 2420/07* (2013.01); *H05B 37/0272* (2013.01)

(58) Field of Classification Search
  None
  See application file for complete search history.

(56) References Cited

U.S. PATENT DOCUMENTS

2010/0226487 A1* 9/2010 Harder et al. ............ 379/202.01
2015/0163881 A1* 6/2015 Pederson ........... H05B 33/0854

* cited by examiner

*Primary Examiner* — Andrew L Sniezek
(74) *Attorney, Agent, or Firm* — Anova Law Group, PLLC

(57) ABSTRACT

Multifunctional LED devices and multifunctional LED wireless conference systems are provided. A multifunctional LED device includes LED light source assembly, LED drive and power supply unit, controller unit, audio power amplifier unit, microphone module, wireless transceiver module, speaker unit, and/or audio codec unit. The wireless transceiver module is configured to communicate with each of a smart terminal and a second multifunctional LED device. A multifunctional LED wireless conference system includes at least two multifunctional LED devices and at least one smart terminal to read status of and to remotely control the at least two multifunctional LED devices. The smart terminal communicates with outside terminal(s) to send audio signals from the outside terminal(s) to the multifunctional LED device(s) for broadcasting. Meanwhile, the multifunctional LED devices collect ambient sound and send the ambient sound to the outside terminals via the smart terminal so that wireless conference function can be achieved.

20 Claims, 2 Drawing Sheets

MULTIFUNCTIONAL LED DEVICE AND MULTIFUNCTIONAL LED WIRELESS CONFERENCE SYSTEM

CROSS-REFERENCES TO RELATED APPLICATIONS

This application is a continuation in part of PCT Application No. PCT/CN2013/072808, filed on Mar. 18, 2013, which claims the priority to Chinese Patent Application No. 201310047401.8, filed on Feb. 1, 2013, the entire contents of which are incorporated herein by reference.

FIELD OF THE DISCLOSURE

The present disclosure relates to the field of LED (light emitting diode) lighting technology and, more particularly, relates to multifunctional LED devices and multifunctional LED wireless conference systems.

BACKGROUND

Wireless technology has been applied to various electronic products and frees people from cumbersome cabling and assembly. These products are now more commonly and widely used. LED devices have also been widely used in various areas for public, commercial, and indoor lighting. LED lighting may provide advantages such as energy conservation, environmental protection, controllable lighting, solid state lighting, and long operational lifetime. Controllable lighting may save energy, and may also improve user experience in various occasions. Wireless dimming is one of the popular means for controlling lighting as an emerging dimming method.

Most of current speakers are wired (as opposed to "wireless") and bulky, which require cumbersome wiring/cabling processes. In the case when a wireless speaker is combined with a lighting lamp, a special wireless transmitter may be required to control and transmit audio frequency signal. Such special wireless transmitter usually has large volume and high cost, which may not be applicable for or match with increasingly grown mobile terminals or other smart terminals.

Currently, most wireless conference systems include a mobile conference terminal and a conference control device. When the mobile conference terminal receives audio and video information inputted by the user, the audio and video information is then uploaded to the conference control device of the wireless conference system. The conference control device then transmits the audio and video information uploaded by the mobile conference terminal to various other mobile terminals in the wireless conference system. However, existing wireless conference systems are typically large in volume and with high cost, which are often not bound in LED lighting devices. In addition, microphones of conventional wireless conference systems may have to be placed in distance and hard to collect sound from various mobile terminals, which may not be adaptable in many occasions.

BRIEF SUMMARY OF THE DISCLOSURE

One aspect or embodiment of the present disclosure includes a multifunctional LED device for communicating with a smart terminal. The multifunctional LED device includes at least one controller unit, at least one audio power amplifier unit, at least one microphone module, at least one wireless transceiver module, and at least one LED light source assembly.

The at least one wireless transceiver module is configured to receive an audio signal and a control signal sent from the smart terminal. The at least one wireless transceiver module is configured to send the audio signal and the control signal to the at least one controller unit for data processing and lighting control; and to simultaneously transmit the audio signal and the control signal to at least a second LED device other than the multifunctional LED device.

The at least one controller unit is configured to perform the data processing of the audio signal or to perform the lighting control corresponding to the control signal. The at least one audio power amplifier unit is configured to receive the audio signal processed by the at least one controller unit and to drive the at least one speaker unit to make a sound. The at least one microphone module is connected to the at least one controller unit to collect ambient sound to send to the at least one controller unit for data processing, and the at least one wireless transceiver module is configured to send the audio signal collected by the at least one microphone module and processed by the at least one controller unit to the smart terminal. The at least one LED light source assembly is configured to provide lighting, and to receive the control signal transmitted from the at least one controller unit and to correspondingly control the lighting.

The multifunctional LED device further includes at least one audio codec unit connected to the at least one controller unit and the at least one audio power amplifier unit. The at least one audio codec unit is configured to send the audio signal processed by the at least one controller unit to the at least one audio power amplifier unit.

The at least one controller unit includes a micro-controller, a digital signal processor, a digital integrated circuit (IC) controller, or a combination thereof. The at least one controller unit is configured to arithmetically process the audio signal.

The at least one wireless transceiver module supports a frequency band including 2.4 GHz, 5.2 GHz, 5.8 GHz, or a combination thereof. The at least one wireless transceiver module supports a bi-directional transmission.

The multifunctional LED device further includes at least one LED drive and power supply unit configured to electrically drive the LED light source assembly and to power the entire multifunctional LED device. The multifunctional LED device further includes at least one speaker unit connected to the at least one audio power amplifier unit to make the sound.

The multifunctional LED device includes an audio playing function and an audio collecting function. The at least one controller unit, the at least one audio power amplifier unit, the at least one microphone module, and the at least one wireless transceiver module are integrated into the at least one LED light source assembly to form a single device.

Another aspect or embodiment of the present disclosure includes a multifunctional LED wireless conference system including at least two multifunctional LED devices and at least one smart terminal. Each of the at least two multifunctional LED devices includes at least one controller unit, at least one audio power amplifier unit, at least one microphone module, at least one wireless transceiver module, and at least one LED light source assembly.

The at least one smart terminal is configured to read status of and to remotely control the at least two multifunctional LED devices. The at least one smart terminal establishes a communication with one or more outside terminals outside of the multifunctional LED wireless conference system. The at least one smart terminal sends the audio signal sent from the one or more outside terminals to the at least two multifunctional LED devices for broadcasting. The at least two multifunctional LED devices simultaneously collect ambient sound to send to the one or more outside terminals through the at least one smart terminal.

The at least one wireless transceiver module is configured to receive an audio signal and a control signal sent from the smart terminal. The at least one wireless transceiver module is configured to send the audio signal and the control signal to the at least one controller unit for data processing and lighting control; and to simultaneously transmit the audio signal and the control signal to at least a second LED device other than the multifunctional LED device.

The at least one controller unit is configured to perform the data processing of the audio signal or to perform the lighting control corresponding to the control signal. The at least one audio power amplifier unit is configured to receive the audio signal processed by the at least one controller unit and to drive the at least one speaker unit to make a sound. The at least one microphone module is connected to the at least one controller unit to collect ambient sound to send to the at least one controller unit for data processing, and the at least one wireless transceiver module is configured to transmit the audio signal collected by the at least one microphone module and processed by the at least one controller unit to the smart terminal. The at least one LED light source assembly is configured to provide lighting, and to receive the control signal transmitted from the at least one controller unit and to correspondingly control the lighting.

Each of the at least two multifunctional LED devices further includes at least one audio codec unit connected to the at least one controller unit and the at least one audio power amplifier unit. The at least one audio codec unit is configured to send the audio signal processed by the at least one controller unit to the at least one audio power amplifier unit.

The at least one controller unit includes a micro-controller, a digital signal processor, a digital integrated circuit (IC) controller, or a combination thereof. The at least one controller unit is configured to arithmetically process the audio signal. The at least one wireless transceiver module supports a frequency band including 2.4 GHz, 5.2 GHz, 5.8 GHz, a combination thereof. The at least one wireless transceiver module supports a bi-directional transmission.

Each of the at least two multifunctional LED devices further includes at least one LED drive and power supply unit configured to electrically drive the LED light source assembly and to power the entire multifunctional LED device. Each of the at least two multifunctional LED devices includes at least one speaker unit connected to the at least one audio power amplifier unit to make the sound.

Each of the at least two multifunctional LED devices includes an audio playing function and an audio collecting function. The at least one controller unit, the at least one audio power amplifier unit, the at least one microphone module, and the at least one wireless transceiver module are integrated into the at least one LED light source assembly to form a single device for each of the at least two multifunctional LED devices.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
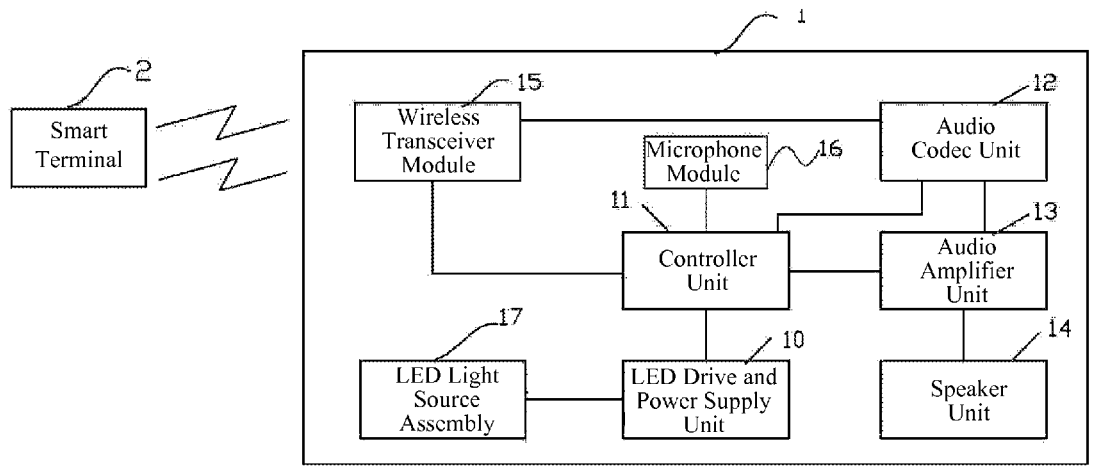
FIG. 1 depicts an exemplary multifunctional LED device consistent with various disclosed embodiments.

Reference will now be made in detail to exemplary embodiments of the disclosure, which are illustrated in the accompanying drawings. Wherever possible, the same reference numbers will be used throughout the drawings to refer to the same or like parts.

Multifunctional LED devices and multifunctional LED wireless conference systems are provided. Exemplary multifunctional LED device (and/or multifunctional LED wireless conference system) can have a substantially small volume with low cost and can be assembled easily. Further, existing wiring can still be used without further changes.

The multifunctional LED device can be configured to communicate with a smart terminal. The multifunctional LED device can include, for example, at least one controller unit, at least one audio power amplifier unit, at least one speaker unit, at least one microphone module, at least one wireless transceiver module, at least one LED drive and power supply unit, and/or at least one LED light source assembly.

The at least one LED drive and power supply unit can be configured to the drive at least one LED light source assembly and to power the entire LED device. The at least one controller unit can be configured to process and/or control an audio signal and/or other suitable signal (e.g., a control signal and/or a video signal). The controller unit can perform data processing and/or the corresponding lighting control process. The at least one audio power amplifier unit can be configured to receive the audio signal processed by the at least one controller unit and to drive a speaker unit to make a sound. Accordingly, the at least one speaker unit is connected to the audio power amplifier unit to make a sound.

The at least one microphone module is connected to the at least one controller unit. The at least one microphone module collects ambient sound to send to the controller unit for processing. The at least one wireless transceiver module is configured to receive an audio signal and/or control signal sent from a smart terminal, and then send the received audio signal and/or control signal to the controller unit for processing, and meanwhile, to transmit the received audio signal or control signal to other LED devices. The at least one wireless transceiver module may also be configured to transmit the audio signal collected by the microphone module to the smart terminal, e.g., through the controller unit. The at least one LED light source assembly is configured to provide lighting and to receive the control signal transmitted by the controller unit and to correspondingly adjust the control signal.

Optionally, the multifunctional LED device can further include at least one audio codec unit connected to each of the controller unit and the audio power amplifier unit. The audio codec unit can be configured to send the processed audio signal to the audio power amplifier unit.

Optionally, the controller unit can include a micro-controller, a digital signal processor, a digital integrated circuit (IC) controller, or a combination thereof. The controller unit can arithmetically process any inputted audio signal.

Optionally, the wireless transceiver module can support frequency bands including 2.4 GHz, 5.2 GHz, 5.8 GHz, and a combination thereof, and/or can support a bi-directional transmission.

A multifunctional LED wireless conference system can include at least two multifunctional LED devices described herein, and at least one smart terminal configured to read status of the multifunctional LED device(s) and to remotely control multifunctional LED device(s) in the system. The smart terminal can establish communication with the outside terminals outside of this multifunctional LED wireless conference system. The smart terminal can send an audio signal received from the outside terminal(s) to the multifunctional LED devices for broadcasting. Meanwhile, the multifunctional LED device can collect ambient sound, which can be sent to the outside terminal(s) through the smart terminal.

In various embodiments, each of the smart terminals and/or outside terminals can include, but is not limited to, a smart phone, a smart TV, a tablet computer, and/or a desktop computer.

The multifunctional LED device can include an audio playing function. The wireless transceiver module can communicate with the smart terminal and can also communicate with other LED devices. Such configuration can reduce cost, and can save volume. Further, the audio codec unit can be optionally installed in the multifunctional LED device as needed, which can decode the digital audio signal for normal playing.

The multifunctional LED device can include an audio collecting function. For example, the multifunctional LED device can include a microphone module built within the device. Using the microphone module, the multifunctional LED device can collect all sound, e.g., in a room, and feedback to the smart terminal through the wireless transceiver module.

The multifunctional LED wireless conference system can be built such that the smart terminal can communicate with outside terminal(s). The multifunctional LED wireless conference system can include the smart terminal in combination with a plurality of multifunctional LED devices to perform audio collection/capture and to perform voice interaction, and to cancel the echo to avoid interference with each other. Clear and desired conference effect can thus be obtained in a large conference room.

In operation, the LED drive and power supply unit drives the LED light source assembly and powers the entire multifunctional LED device. The smart terminal receives audio signal from outside terminal(s) to transmit to the wireless transceiver module. The wireless transceiver module then sends the received audio signal to the controller unit. The controller unit arithmetically processes the audio signal and sends the processed audio signal to each of the wireless transceiver module and the audio power amplifier unit. The wireless transceiver module also transmits the audio signal to other LED device(s) and plays the audio signal through the speaker unit.

Meanwhile, voices/sound from people in a room, where the multifunctional LED device is placed, can be: collected by the microphone module, sent to the controller unit for processing, and sent to the smart terminal through the wireless transceiver modules, and then transmit to outside terminal(s) through the smart terminal to achieve wireless conference features. In addition, the smart terminal can switch and/or control lighting of the multifunctional LED devices in the multifunctional LED wireless conference system.

Compared with existing technology, the disclosed devices and systems can provide easy assembly without changing existing wiring/cabling, can wirelessly control lighting (e.g., dimming) and can provide daily lighting. The disclosed devices can be used to directly replace traditional lamps and traditional LED lights. The disclosed systems can have a simple overall structure with low cost. The disclosed systems can support wireless audio frequency signals and replace existing conference systems. In addition, the position of the disclosed LED device(s) can be adjusted as desired with any desirable configurations such that the microphone module in the multifunctional LED device(s) can collect sound in a wide range, which provides adaptability to various occasions with high practical value and application prospect.

FIG. 1 depicts an exemplary multifunctional LED device consistent with various disclosed embodiments. The multifunctional LED device can include, for example, at least one LED drive and power supply unit 10, at least one controller unit 11, at least one audio codec unit 12, at least one audio power amplifier unit 13, at least one speaker unit 14, at least one wireless transceiver module 15, at least one microphone module 16, and/or at least one LED light source assembly 17.

The wireless transceiver module 15 can maintain communication between the smart terminal 2 and other LED devices (not shown). The other LED device(s) can be, e.g., a second multifunctional LED device as disclosed. The LED drive and power supply unit 10 can be configured to drive the LED light source assembly 17 and to provide power to the entire multifunctional LED device 1. The smart terminal 2 can transmit wireless digital audio signals and/or control signals to the wireless transceiver module 15.

In some embodiments, the wireless transceiver module 15 can send the received wireless digital audio signals and control signals to the controller unit 11. After the controller unit 11 algorithmically processes wireless digital audio signals and correspondingly sends out the control signals, the processed signals can be sent to the audio power amplifier unit 13.

In other embodiments, the wireless transceiver module 15 can send the received wireless digital audio signals and control signals to the audio codec unit 12 for the audio codec unit 12 to decode the wireless digital audio signal and then send to each of the audio power amplifier unit 13 and the wireless transceiver module 15. In some cases, the at least one audio codec unit 12 can be configured to send the audio signal processed by the at least one controller unit 11 to the at least one audio power amplifier unit.

The controller unit 11 can send a control feedback signal to the user smart terminal 2 via the wireless transceiver module 15. The wireless transceiver module 15 can process signals received and then transmit to other LED devices (e.g., a second multifunctional LED device).

The controller unit 11 can be a microcontroller, a digital signal processor, a digital IC controller, or a combination thereof. The controller unit 11 can arithmetically process the audio signal, e.g., inputted from the wireless transceiver module 15 or the audio codec unit 12. For example, the controller unit 11 can be connected to the wireless transceiver module 15 to obtain the wireless digital audio signal and/or control signal received from the smart terminal 2. Locally, the controller unit 11 can correspondingly control and/or data process the control signal and/or the wireless digital audio signal and then output the processed signals to the audio power amplifier unit 13. The audio power amplifier unit 13 can be connected to the speaker unit 14. The controller unit 11 can communicate with the wireless transceiver module 15 to send the control signal to, e.g., a second wireless transceiver module in a second suitable multifunctional LED devices.

The microphone module 16 can collect all sound, e.g., in a conference room, which is then processed by the controller unit 11, and then sent to the smart terminal 2 through the wireless transceiver module 15.

In one embodiment, the wireless transceiver module 15 can support a frequency band including 2.4 GHz, 5.2 GHz, 5.8 GHz, and a combination thereof; and can support a bi-directional transmission. In addition, the wireless transceiver module 15 can access the Internet or any suitable network, and can be remotely controlled.

The LED drive and power supply unit 10 can drive the LED light source assembly 17. The controller unit 11 can generate a PWM (pulse-width module) signal for controlling lighting (e.g., dimming) of the LED light source assembly 17. The controller unit 11 can be directly connected to the LED drive and power supply unit 10. The controller unit 11 can set and output PWM signal, e.g., to the wireless transceiver module 15. The PWM signal can be set to have a fixed constant frequency with an adjustable or constant duty cycle, and/or an adjustable frequency with a fixed duty cycle. In various embodiments, the smart terminal 2 can include phones, smart TVs, tablet computers, or desktop computers.

Figure 2:
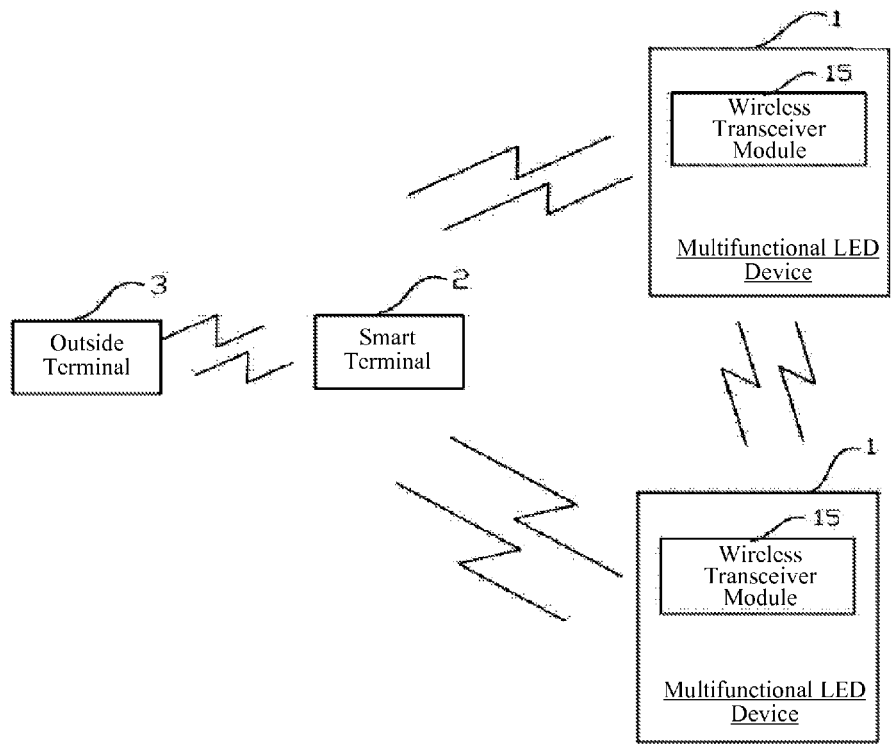
FIG. 2 depicts an exemplary multifunctional LED wireless conference system consistent with various disclosed embodiments.

FIG. 2 depicts an exemplary multifunctional LED wireless conference system. The exemplary multifunctional LED wireless conference system can include a plurality of multifunctional LED devices 1 and at least one smart terminal 2. The smart terminal 2 can establish a communication with outside terminals 3, meanwhile, the smart terminals 2 can communicate with each multifunctional LED device in the multifunctional LED wireless conference system. The plurality of multifunctional LED devices can communicate with each other. The smart terminal 2 can send audio signals (e.g., received from the outside terminal(s) 3) to the multifunctional LED device(s) 1 for broadcasting, while the multifunctional LED device(s) 1 can collect ambient sound to send to the outside terminal(s) 3 through the smart terminal 2 to achieve sound interaction between the multifunctional LED device(s) 1 and the outside terminal(s) 3. The outside terminal(s) 3 can include one or more of telephones, smart phones, smart TVs, tablets computers, or desktop computers.

Figure 3:
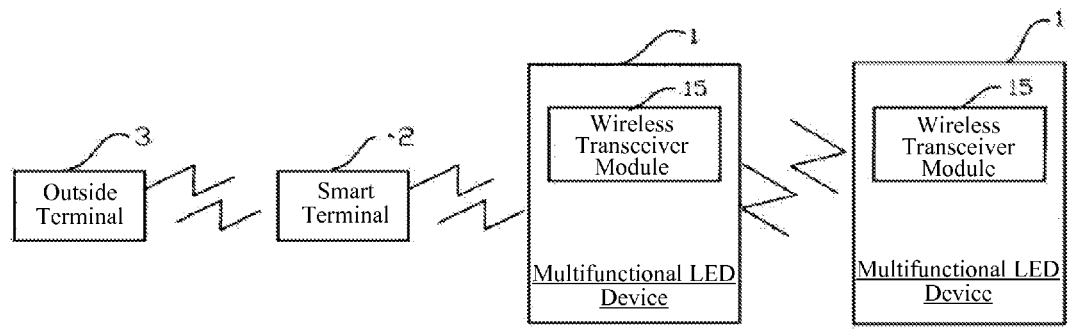
FIG. 3 depicts another exemplary multifunctional LED wireless conference system consistent with various disclosed embodiments.

FIG. 3 depicts another exemplary multifunctional LED wireless conference system consistent with various disclosed embodiments. In the exemplary multifunctional LED wireless conference system of FIG. 3, each of the multifunctional LED devices is configured to include a wireless transceiver module 15.

The exemplary multifunctional LED wireless conference system can include a multifunctional speaker system configured to use the smart terminal 2 via an application program to arbitrarily set one of the multifunctional LED devices as a central device (or a central multifunctional LED device), while other multifunctional LED device(s) in the multifunctional LED wireless conference system can be set as receiving device(s) (or receiving multifunctional LED devices) according to the application program of the smart terminal 2. The central multifunctional LED device can receive wireless audio signals and control signals from the smart terminal 2 and to transmit to all of other receiving multifunctional LED device(s).

In other embodiments, the smart terminal 2 can be used as a central device and all of multifunctional LED devices in the multifunctional LED wireless conference system can form a mesh-shaped network or a star-shaped network controlled by the central device, e.g., the smart terminal 2.

Figure 4:
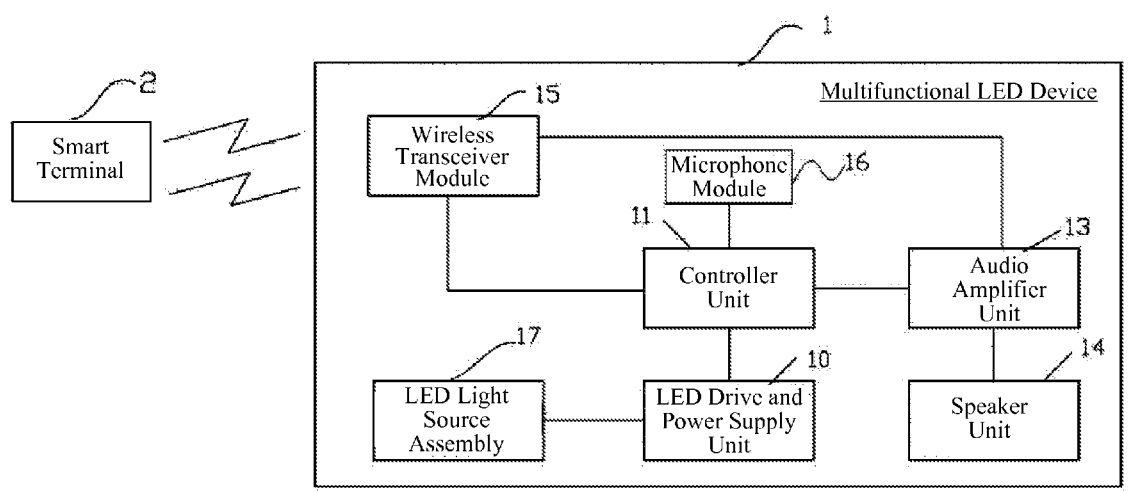
FIG. 4 depicts another exemplary multifunctional LED device consistent with various disclosed embodiments.

FIG. 4 depicts another exemplary multifunctional LED device consistent with various disclosed embodiments. The exemplary multifunctional LED device in FIG. 4 can be configured similarly to the exemplary multifunctional LED device shown in FIG. 1 except that the exemplary multifunctional LED device in FIG. 4 does not include the audio codec unit 12 of FIG. 1.

In FIG. 4, the smart terminal 2 can send the wireless audio signals and the control signals to the wireless transceiver module 15. The wireless transceiver module 15 can send the received wireless audio signals and control signals to the controller unit 11 for the controller unit 11 to algorithmically process and/or to correspondingly control. The processed signals can then be sent by the controller unit 11 to the wireless transceiver module 15 and the audio power amplifier unit 13. As similarly described in FIG. 1, the wireless transceiver module 15 can be connected to the audio power amplifier unit 13 and the audio power amplifier unit 13 can be connected to the speaker unit 14.

In various embodiments, the multifunctional LED device can be configured as one single device. For example, the at least one LED drive and power supply unit, the at least one controller unit, the at least one audio power amplifier unit, the at least one microphone module, the at least one wireless transceiver module, the at least one speaker unit, and/or the at least one audio codec unit, can be integrated into the at least one LED light source assembly to form the single device. Accordingly, the multifunctional LED wireless conference system can include a plurality of the multifunctional LED devices each configured as one single device.

In an exemplary multifunctional LED device, the microphone module and/or the speaker unit can be integrated together with driver circuit of the LED drive and power supply unit to save space and to reduce wire loss on of a distributed design. In one embodiment, to ensure RF transceiver functions as the wireless transceiver module as desired, an embedded antenna can be included in the integrated multifunctional LED device. The embedded antenna can be configured to fit a shape of the lamp body of the multifunctional LED device without increasing size of the resultant device and to maintain the design of the resultant device. In various embodiments, the wireless transceiver modules can be configured with automatic frequency hopping functions to avoid interference with other radio devices. Furthermore, noise reduction and/or echo cancellation technologies can be applied using software and hardware products to provide the multifunctional LED device with desired audio effects.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Multifunctional LED devices and multifunctional LED wireless conference systems are provided. A multifunctional LED device may include an LED light source assembly, a LED drive and power supply unit, a controller unit, an audio power amplifier unit, a microphone module, a wireless transceiver module, a speaker unit, and/or an audio codec unit. The wireless transceiver module is configured to communicate with each of a smart terminal and a second multifunctional LED device. A multifunctional LED wireless conference system may include at least two multifunctional LED devices and at least one smart terminal to read status of and to remotely control the at least two multifunctional LED devices. The smart terminal may communicate with outside terminal(s) to send audio signals from the outside terminal(s) to the multifunctional LED device(s) for broadcasting. Meanwhile, the multifunctional LED devices may collect ambient sound to send to the outside terminals via the smart terminal to achieve wireless conference function.

In some embodiments, one conference system may include multiple multifunctional LED devices. Based on the control of a smart terminal, each multifunctional LED device may be used to accommodate various user needs. For example, a conference may have users from two remote sites on the same audio/video conference. The users from site A may choose to attend the conference by video. The users from site B may choose to attend the conference by audio. The multifunctional LED device at site A may thus control the LED light source assembly to facilitate video conferences (e.g., dimming light for certain videos). The multifunctional LED device at site B may control the LED light source assembly to better facilitate audio conferences. In this example, lighting for different conference settings may be independently controlled for each remote site.

In some embodiments, the multifunctional LED device may include one or more sensors for detecting objects or movements of objects in a conference room. The control unit may then control the multifunctional LED devices based on the data received from the sensors. For example, in a conference room using multiple multifunctional LED devices for a conference call, the sensors integrated in the multifunctional LED devices may detect the position and movements of the speaker in the meeting room. The multifunctional LED wireless conference system may then adjust the multifunctional LED device(s) close (or closet) to the speaker to better pick up the speech and adjust the multifunctional LED device(s) far away from the speaker to reduce the background noise on the conference call.

In various embodiments, the multifunctional LED device can be integrated as one single device. Accordingly, the multifunctional LED wireless conference system can include a plurality of the multifunctional LED devices each configured as one single device. The multifunctional LED device (and/or multifunctional LED wireless conference system) can have a substantially small volume with low cost and can be assembled easily. The disclosed devices and systems provide easy assembly without changing existing wiring/cabling, can wirelessly control lighting (e.g., dimming) and can provide daily lighting. The disclosed devices can be used to directly replace traditional lamps and traditional LED lights. The disclosed systems can have a simple overall structure with low cost. The disclosed systems can support wireless audio frequency signals and can replace existing conference systems. In addition, the position of the disclosed LED device(s) can be adjusted as desired with any desirable configurations such that the microphone module in the multifunctional LED device(s) can collect sound in a wide range, which provides adaptability to various occasions with high practical value and application prospect.

REFENCE SIGN LIST

Multifunctional LED device 1
Smart terminal 2
Outside terminal 3
LED drive and power supply unit 10
Controller unit 11
Audio codec unit 12
Audio power amplifier unit 13
Speaker unit 14
Wireless transceiver module 15
Microphone module 16
LED light source assembly 17

What is claimed is:

1. A multifunctional Light-Emitting Diode (LED) device for communicating with a smart terminal, comprising:
    at least one controller unit, at least one audio power amplifier unit, at least one speaker unit, at least one microphone module, at least one wireless transceiver module, and at least one LED light source assembly, wherein:
    the at least one wireless transceiver module is configured to receive an audio signal and a control signal sent from the smart terminal, wherein the at least one wireless transceiver module is configured to send the audio signal and the control signal to the at least one controller unit for data processing and lighting control; and to simultaneously transmit the audio signal and the control signal to at least a second LED device other than the multifunctional LED device;
    the at least one controller unit is configured to perform the data processing of the audio signal or to perform the lighting control corresponding to the control signal;
    the at least one audio power amplifier unit is configured to receive the audio signal processed by the at least one controller unit and to drive the at least one speaker unit to make a sound;
    the at least one microphone module is connected to the at least one controller unit to collect ambient sound to send to the at least one controller unit for data processing, and the at least one wireless transceiver module is configured to transmit the audio signal collected by the at least one microphone module and processed by the at least one controller unit to the smart terminal; and
    the at least one LED light source assembly is configured to provide lighting, and to receive the control signal transmitted from the at least one wireless transceiver module and to correspondingly control the lighting.

2. The device according to claim 1, further including at least one audio codec unit connected to the at least one controller unit and the at least one audio power amplifier unit, wherein the at least one audio codec unit is configured to send the audio signal processed by the at least one controller unit to the at least one audio power amplifier unit.

3. The device according to claim 1, wherein the at least one controller unit includes a micro-controller, a digital signal processor, a digital integrated circuit (IC) controller, or a combination thereof.

4. The device according to claim 1, wherein the at least one controller unit is configured to arithmetically process the audio signal.

5. The device according to claim 1, wherein the at least one wireless transceiver module supports a frequency band including 2.4 GHz, 5.2 GHz, 5.8 GHz, and a combination thereof.

6. The device according to claim 1, wherein the at least one wireless transceiver module supports a bi-directional transmission.

7. The device according to claim 1, further including at least one LED drive and power supply unit configured to electrically drive the LED light source assembly and to power the entire multifunctional LED device.

8. The device according to claim 1, further including at least one speaker unit connected to the at least one audio power amplifier unit to make the sound.

9. The device according to claim 1, wherein the multifunctional LED device includes an audio playing function and an audio collecting function.

10. The device according to claim 1, wherein the at least one controller unit, the at least one audio power amplifier unit, the at least one microphone module, and the at least one wireless transceiver module are integrated into the at least one LED light source assembly to form a single device.

11. A multifunctional Light-Emitting Diode (LED) wireless conference system, comprising:
   at least two multifunctional LED devices and at least one smart terminal,
   wherein each of the at least two multifunctional LED devices includes at least one controller unit, at least one audio power amplifier unit, at least one speaker unit, at least one microphone module, at least one wireless transceiver module, and at least one LED light source assembly, and
   wherein:
   the at least one wireless transceiver module in each of the at least two multifunctional LED devices is configured to receive an audio signal and a control signal sent from the smart terminal, wherein the at least one wireless transceiver module is configured to send the audio signal and the control signal to the at least one controller unit for data processing and lighting control; and to simultaneously transmit the audio signal and the control signal to at least a second LED device other than the multifunctional LED device;
   the at least one controller unit in each of the at least two multifunctional LED devices is configured to perform the data processing of the audio signal or to perform the lighting control corresponding to the control signal;
   the at least one audio power amplifier unit in each of the at least two multifunctional LED devices is configured to receive the audio signal processed by the at least one controller unit and to drive the at least one speaker unit to make a sound;
   the at least one microphone module in each of the at least two multifunctional LED devices is connected to the at least one controller unit to collect ambient sound to send to the at least one controller unit for data processing, and the at least one wireless transceiver module is configured to transmit the audio signal collected by the at least one microphone module and processed by the at least one controller unit to the smart terminal; and
   the at least one LED light source assembly in each of the at least two multifunctional LED devices is configured to provide lighting, and to receive the control signal transmitted from the at least one wireless transceiver module and to correspondingly control the lighting.

12. The system according to claim 11, wherein:
   the at least one smart terminal is configured to read status of and to remotely control the at least two multifunctional LED devices;
   the at least one smart terminal establishes a communication with one or more outside terminals outside of the multifunctional LED wireless conference system; and
   the at least one smart terminal sends the audio signal sent from the one or more outside terminals to the at least two multifunctional LED devices for broadcasting, wherein the at least two multifunctional LED devices simultaneously collect ambient sound to send to the one or more outside terminals through the at least one smart terminal.

13. The system according to claim 11, wherein the at least one smart terminal includes a smart mobile phone, a television (TV), a tablet computer, or a desktop computer.

14. The system according to claim 11, wherein each of the at least two multifunctional LED devices includes at least one audio codec unit connected to the at least one controller unit and the at least one audio power amplifier unit, wherein the at least one audio codec unit is configured to send the audio signal processed by the at least one controller to the at least one audio power amplifier unit.

15. The system according to claim 11, wherein the at least one controller unit is configured to arithmetically process the audio signal and includes a micro-controller, a digital signal processor, a digital integrated circuit (IC) controller, or a combination thereof.

16. The system according to claim 11, wherein the at least one wireless transceiver module supports a bi-directional transmission, and supports a frequency band including 2.4 GHz, 5.2 GHz, 5.8 GHz, and a combination thereof.

17. The system according to claim 11, wherein each of the at least two multifunctional LED devices further includes at least one LED drive and power supply unit configured to electrically drive the LED light source assembly and to power the entire multifunctional LED device.

18. The system according to claim 11, wherein each of the at least two multifunctional LED devices further includes at least one speaker unit connected to the at least one audio power amplifier unit to make the sound.

19. The system according to claim 11, wherein each of the at least two multifunctional LED devices includes an audio playing function and an audio collecting function.

20. The system according to claim 11, wherein the at least one controller unit, the at least one audio power amplifier unit, the at least one microphone module, and the at least one wireless transceiver module are integrated into the at least one LED light source assembly to form a single device.

* * * * *